United States Patent [19]

Carbone

[11] Patent Number: 4,525,748
[45] Date of Patent: Jun. 25, 1985

[54] METHOD AND APPARATUS FOR SCANNING AND DIGITIZING OPTICAL IMAGES

[76] Inventor: Anthony K. Carbone, Rte. 1, Box 250, Bluemont, Va. 22012

[21] Appl. No.: 403,425

[22] Filed: Jul. 30, 1982

[51] Int. Cl.³ .............................................. H04N 1/40
[52] U.S. Cl. ................................. 358/286; 358/293; 358/280; 400/124
[58] Field of Search ............... 358/293, 284, 286, 283, 358/213, 289, 290, 291, 292, 294, 296, 302, 280; 400/124, 708; 346/78

[56] References Cited

U.S. PATENT DOCUMENTS

| | | | |
|---|---|---|---|
| 4,034,400 | 7/1977 | Owen et al. | 358/75 |
| 4,122,352 | 10/1978 | Crean et al. | 250/566 |
| 4,147,928 | 4/1979 | Crean et al. | 250/566 |
| 4,149,090 | 4/1979 | Agulnek | 250/566 |
| 4,149,091 | 4/1979 | Crean et al. | 250/566 |
| 4,179,620 | 12/1979 | Agulnek | 250/566 |
| 4,179,621 | 12/1979 | Crean et al. | 250/566 |
| 4,199,784 | 4/1980 | Wellendorf et al. | 358/296 |
| 4,203,136 | 5/1980 | Wellendorf et al. | 358/280 |
| 4,210,936 | 7/1980 | Cinque et al. | 358/284 |
| 4,240,117 | 12/1980 | Wellendorf et al. | 358/296 |
| 4,257,071 | 3/1981 | Lamb | 358/286 |
| 4,266,250 | 5/1981 | Heinzl et al. | 358/285 |
| 4,272,204 | 6/1981 | Quinn, Jr. et al. | 400/708 |

OTHER PUBLICATIONS

J. C. Edwards, "Image Transducer for a Typewriter", IBM Technical Disclosure Bulletin, vol. 23, No. 7B, 12/1980.

Byte Publications, Inc., pp. 220-248, (Feb. 1981).

Primary Examiner—John C. Martin
Assistant Examiner—Edward L. Coles
Attorney, Agent, or Firm—Sandler & Greenblum

[57] ABSTRACT

A dot-matrix printer is adapted to include an optical scanner for opto-electrically sensing the optical intensity levels of an image-bearing medium in order to provide a digitized representation of the image. The sensor can be mounted on a housing in the printer for continuous linear movement across the image while the sensor is scanning. Sampling means responsive to the printer strobe command signal is provided for sampling the output of the sensor at predetermined intervals. This output is loaded line by line into a memory buffer. Means for processing the sampled output of the sensor into a form compatible with a dot-matrix printer is also provided. A method of generating a digitized representation of an image using a dot-matrix printer adapted to include an optical scanner for opto-electrically scanning the optical intensity levels of an image-bearing medium is also provided. The representation can have either bilevel or gray-scale quality. In the case of gray-scale quality, the representation of the original image has more than one pixel space for containing dots corresponding to each sampled pixel in the original image whereby gray-scale resolution is provided by the distribution of dots in the reproduced image.

30 Claims, 13 Drawing Figures

METHOD AND APPARATUS FOR SCANNING AND DIGITIZING OPTICAL IMAGES

FIELD OF THE INVENTION

This invention relates to systems for electro-optically scanning and digitizing an image to generate a reproduced representation of the image, and more particularly, to a system for scanning the image line-by-line, and processing the data for simultaneous printing of a plurality of lines by a printer which has a plurality of print elements.

BACKGROUND OF THE INVENTION

Generally, the digitization of optical images for computer storage requires the use of either a video processing system or a digitizing pad. Video processing systems are very expensive but can digitize an image in fractions of a second. Digitizing pads are moderately expensive but require human control and are hence very slow. The resolution afforded by video systems is low while that provided by digitizing pads is high.

The transmission of optical images requires the use of facsimile machines using either analog signal or digital data transmission methods. The resolution of facsimile machines is better than that of video machines but not as good as digitizing pads. Cost is usually very high.

Some systems provide multiple optical sensor arrays for scanning wide images, for example, U.S. Pat. Nos. 4,147,928, 4,122,352, 4,149,090, 4,149,091, 4,179,620 and 4,179,621. Other systems provide a plurality of optical sensors which scan transversly across the image, for example, U.S. Pat. Nos. 4,203,136 and 4,240,117. In addition, U.S. Pat. No. 4,034,400 discloses a system in which a focused CRT is used to produce a flying spot of light for scanning transparent images for the purpose of photocomposition using photosensitive materials. Also, U.S. Pat. No. 4,266,250 shows a plurality of scanning elements associated with a printing station, such as a mosaic printhead, which moves along a platen, for simultaneously scanning a plurality of lines where the scanner output signals are transmitted to a printer having a plurality of print elements corresponding in number to the number of scanning elements. An article in BYTE PUBLICATIONS, INC., p.220-248 (Feb. 1981) discloses a single optical sensor mounted on an impact printer for storing data representing a scanned image in a computer which requires the optical readings to be made by stopping the printer motion at each reading point.

SUMMARY OF THE INVENTION

The present invention provides for combining the features of digital data entry into computers for storage or processing and direct data transmission. Whether stored or transmitted, the data is in a form compatible with standard dot-matrix printers that are capable of graphics control features.

The present invention can use a standard dot-matrix printer as the mechanical platform on which the optical sensor is mounted. The dot-matrix printer printhead can be removed and replaced by the optical sensor so that the printer is transformed into an image sensing device with the exclusive purpose of image scanning. Or the dot-matrix printer can have removable print and scan heads so that it can serve a dual purpose print and scan function at the option of the user. Or the dot-matrix printer printhead can be left in place and the optical sensor permanently mounted so that it is a dual purpose device. Or the dot-matrix printer can have a removable optical scan head which snaps in place in the same manner as the ribbon cartridges.

The present invention can use a single optical sensor which is capable of sensing an area equal to or less than the diameter of the dot size of the dot-matrix printer. The sensed area is called a picture cell or pixel. The image can consist of black and white values, such as a line drawing, or shades of gray, such as a photograph. The invention provides a mechanism in which the user may select which type of these two classes of images is the subject matter.

This invention can use a single optical sensor mounted on a moving platform which operates in a linear motion. The moving platform consists of a mechanical arrangement identical to that of moving head dot-matrix printers wherein once the head reaches its terminal velocity, strobe commands are generated which cause the dot-matrix print technique to be activated on-the-fly. The invention can use the strobe command of the printer mechanism to enable readings of the optical sensor.

As the optical sensor traverses the image, each strobe command causes a sampling of the optical intensity level to be made until a predetermined number of readings have been made corresponding to the width of the image. The optical level associated with each reading is processed depending on whether the image is of the line or photograhic type. The processed level can be stored in a buffer which can be equivalent in width to the image width.

The buffer can be a memory array n bits high by m bits wide. The height of the array is a predetermined value corresponding to the height of the dot-matrix printhead. During the first pass of the optical sensor, the first row of the array is loaded. The mechanism is then caused to move the image the equivalent of one vertical dot in height. Each subsequent pass of the sensor loads a corresponding row until the n rows are filled. At this point, the data contained in the memory array is compressed depending on whether the printer has "gaphics tab", "repeat character", or other character skipping control features. Following this, the data contained in the memory array can be sent to the host computer for storage or to a data transmission device such as a modem. The array is sent by outputting each column of n-bits in either serial or parallel form. After the m-th bit is sent, a control sequence is sent which corresponds to a line feed for the printer.

In the line copy or binary mode of operation, the optical level is sensed to determine if the image read by the sensor is either black or white. This is a binary decision process causing either a data bit 1 or data bit 0 to be loaded into the array at point n, m.

In the photographic mode, the optical level is sensed. Its value corresponds to the grayness of the image in the sensed area. Any number of gray-levels can be processed. For each gray level, a look-up table can be provided which consists of a specific configuration of dots. This dot pattern is loaded into the memory array.

In the photographic or gray-scale mode, the reproduced image can have a data density which is greater than the sampling density where the sampling density is defined as the spacing between samplings of the original image. Thus, for each sampled pixel, more than one pixel space is allocated in the reproduced image. In other words, the associated pixel in the reproduced image is larger than its associated pixel in the original image. The distribution of dots within the various pixel spaces contained in the reproduced image provides gray-scale resolution. This distribution pattern can vary in accordance with the sensed optical intensity level of the corresponding original image pixel.

Alternatively, a gray-scale mode can be provided by varying the optical intensity of a single dot produced by an ink jet or other printer. In such systems, the sizes of the original pixels and the corresponding reproduced pixels will be substantially equal, just as with a binary mode as previously described.

The optical sensor can be mounted to the dot-matrix printhead platform in two ways. One method requires that the printhead be unplugged and replaced by the optical sensor. The other method requires that the optical sensor be mounted into a ribbon cartridge or similar housing such that the optical sensor can be substituted for the printer ribbon cartridge. Both methods use a housing for the optical sensor which permits the sensor to be set to the optimum focus point by either forcing the optical sensor to ride against the surface of the image using a type of biasing mechanism or by presetting the focus in a manner which does not require image contact.

Accordingly, it is one object of the invention to provide an improved dot-matrix printer having a sensor mounted to a housing in the printer for continuous linear movement during scanning across an image-bearing medium inserted in the printer paper feed mechanism and having means responsive to the printer strobe command for sampling the output of the sensor at predetermined intervals.

It is another object of the invention to provide an apparatus for opto-electrically scanning and digitizing images having a sensor mounted on a mechanical platform adapted for continuous linear motion across the image-bearing medium, sampling means cooperating with the sensor for sampling the output of the sensor at predetermined intervals to provide a digitized representation of the image, and means for processing the output of the sampling means into a form compatible with a dot-matrix printer.

It is yet another object of the invention to provide an optical sensor which is biased by biasing means to ride against the surface of an image-bearing medium.

It is still another object of the invention to provide an optical sensor having its focus preset such that no contact with the image-bearing medium is required.

It is another object of the invention to provide a method of generating a digitized representation of an image using a dot-matrix printer adapted to include an optical scanner for opto-electrically scanning the optical intensity level of an image.

It is yet another object of the invention to provide a method of generating a digitized gray-scale representation of an image using a dot-matrix printer adapted to include an optical scanner for opto-electrically scanning the optical intensity level of an image.

BRIEF DESCRIPTION OF THE DRAWINGS

The above and other objects, features and advantages of the present invention will be more fully apparent to those of ordinary skill in the art to which this invention pertains from the following detailed description when considered in conjunction with the accompanying drawings in which like reference characters designate like or corresponding parts throughout the several views and wherein.

DETAILED DESCRIPTION OF THE PREFERRED EMBODIMENT

Figure 1:
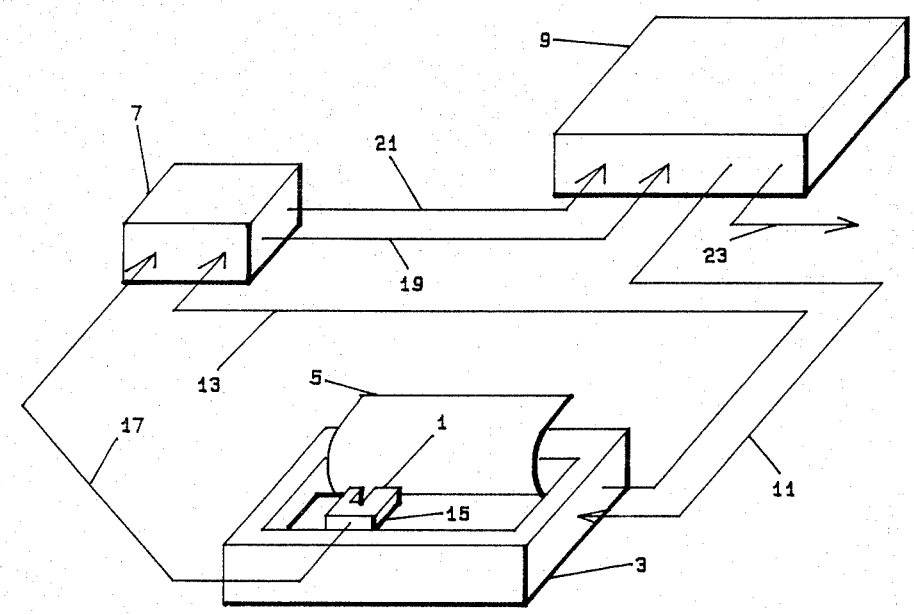
FIG. 1 is a perspective view of a system incorporating features of the invention.

FIG. 1 shows the relationship of optical sensor 1, image-bearing medium 5, and printer 3. Signal processing electronics 7 and computer 9 are also shown. In normal operation, computer 9 uses printer 3 as an output device for the listing of information or the printing of graphics. The data for this purpose is sent to printer 3 over cable 11 as either serial or parallel data. The printer is modified to access the printhead strobe command which is sent over cable 13 to signal processing unit 7. The printhead strobe command is a signal internal to the printer and is well known in the art.

When it is desired to use the image scanning function, the user places the optical sensor 1 on printhead platform 15. The optical sensor data resulting from sensing the intensity of pixels of image-bearing medium 5 is sent to signal processing unit 7 over cable 17. The user places image-bearing medium 5 which can consist of any graphic material into the printer paper feed mechanism 8 and sets the printhead platform 15 to the upper left corner of the image-bearing medium 5.

Computer 9 contains a program or set of instructions which requests the user to specify the image width, height, and copy mode. The computer 9 then begins to control the data acquisition process.

Printer 3 is issued a sequence of commands over cable 11 which cause printhead 5 to make one horizontal pass across image-bearing medium 5. During this pass, the printer issues a strobe command for each print dot location. However, the command sequence is made to consist of blank characters and the printhead performs the "not print" function. The strobe commands are detected in the signal processing unit 7 from cable 13 and sent to computer 9 as an interrupt command over cable 19.

Simultaneously with each strobe command, optical sensor 1 is caused to read the image intensity to send proportional voltage levels to signal processing unit 7 over cable 17. Signal processing unit 7 converts these voltage levels into digital data and sends this data to the computer over cable 21.

Computer 9, upon receipt of each interrupt signal from cable 19 processes the digitized optical sensor data from cable 21 and loads this data into a temporary storage area of memory. When sufficient data has been collected by computer 9, the data is sent out to either a permanent storage device or a data transmission device over cable 23.

Signal processing unit 7 may be built as a standalone unit as shown in FIG. 1 or it may be built into the printer housing 3 as an integral part thereof. Optical sensor 1 can be placed into position on the printhead 15 when the user desires the image processing function or it can be permanently built into printhead 15.

Figure 2:
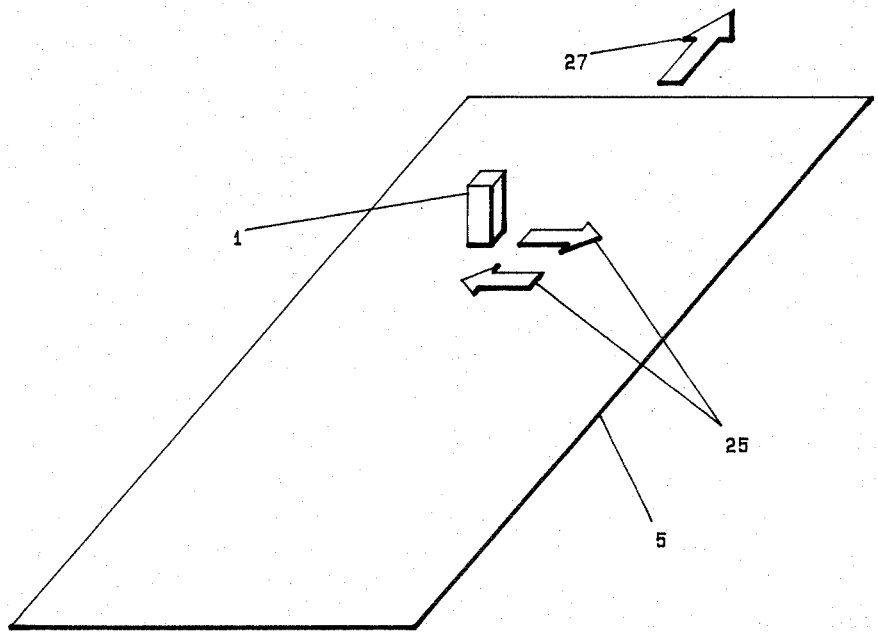
FIG. 2 is a perspective view illustrating the movement of the scan head with respect to the image.

FIG. 2 illustrates the arrangement of optical sensor 1 with respect to an image-bearing medium 5 contained in the print feed mechanism of a dot-matrix printer. The mechanisms for moving optical sensor 1 and image-bearing medium 5 are not illustrated. Such drive means are well known in the art.

Optical sensor 1 is moved linearly across the medium 5 by the action of the dot-matrix printhead platform. This motion, illustrated by arrows 25, is caused by a sequence of commands sent to the printer. The sequence of commands is well known in the art. The width of the motion is predetermined and can be controlled by the sequence of commands. When the printhead reaches its terminal velocity, circuitry (not shown) in the dot-matrix printer begins to issue strobe commands corresponding to each print location. However, because the sequence of commands can be formatted to be blank characters, there will be no printing. The motion 25 can be either unidirectional or bidirectional depending on the characteristics of the printer used as the platform. As illustrated in FIG. 2, bidirectional motion is shown. For a unidirectional printer the motion arrows 25 would all point from left to right.

The dot-matrix printhead consists of an array of mechanisms. These consist of solenoid driven wires, or ink jets, or light sources arranged in a vertical array n-high. In the alphanumeric mode, these printers use all n elements for the printing of characters. In the graphics mode, all or some elements are used. A typical value used is six. Thus, when the printer is printing a sequence of graphic commands, six bits of data are fed to the six printing mechanisms in a one-to-one relationship. The result of this action is that in one pass of the printhead, columns of up to six dots can be printed across the page. The printhead in such printers moves across a page in continuous linear motion while printing, stopping occurring only when lines are changed.

It is required that the single optical sensor 1 make n passes across the image-bearing medium 5 in order to collect the data required for the n print elements of the printhead to print the data in one pass. Thus, during each single pass of optical sensor 1, medium 5 is incremented in the direction of the arrow 27 the equivalent of the height of one print element.

Figure 3:
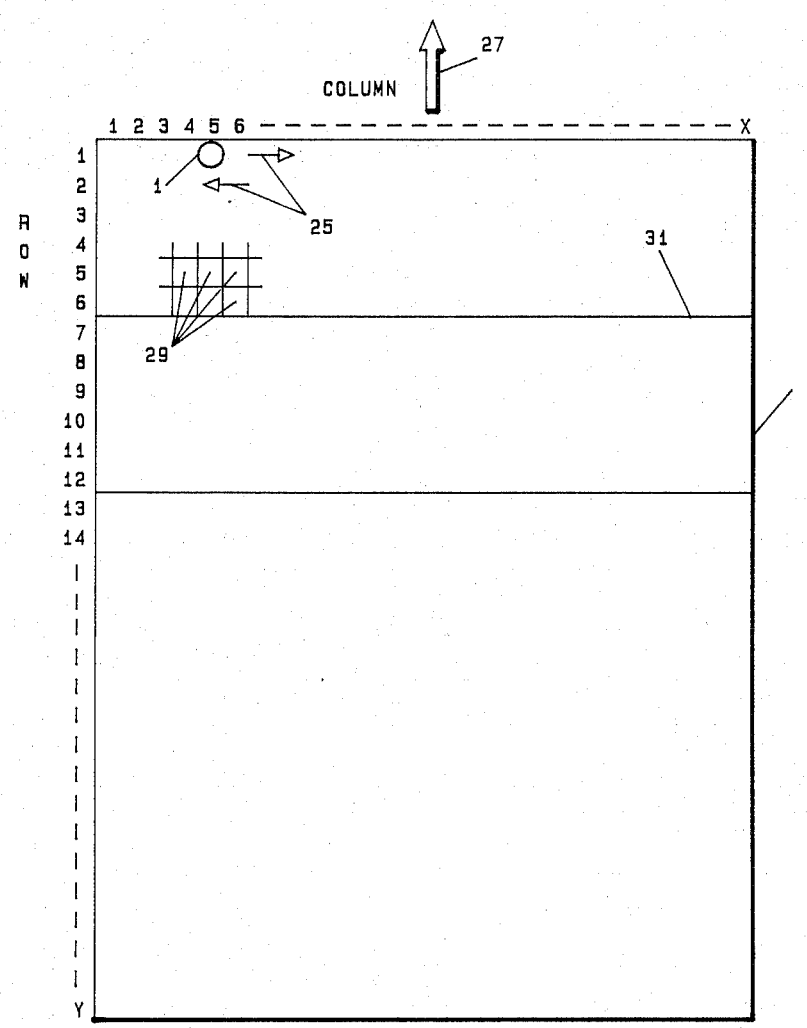
FIG. 3 is a plan view of the image being scanned showing the relationship of the pixels and the movement of the scan head.

FIG. 3 is a plan view of the image to be scanned and shows optical sensor 1 capable of moving in either direction 25 across the medium 5 with the advancement of the medium in the direction of arrow 27. FIG. 3 also shows the arrangement of pixels 29 with x pixels across medium 5 and y pixels down medium 5. Dividing line 31 shows the boundary where, after n passes of optical sensor 1 have been made, sufficient data has been collected for printing. In FIG. 3, boundary line 31 occurs after six passes of optical sensor 1.

In a typical case, dot-matrix printers print 72 dots per inch across the page and 72 dots per inch down the page. For an 8 inch by 10 inch image this corresponds to 414,720 pixels. This data can be stored in bytes where eight bits equal one byte. Because some printers use six bits for one graphics print command, six pixels can be converted to form one byte of information for storage. As a result, the 414,720 pixels can be stored as 69,120 bytes of data. The image can be stored in the computer random access memory (RAM) or in a file space such as is available with disk or tape storage devices. However, an intermediate buffer or memory working space is required to temporarily store the data from each of the n passes of the optical sensor.

Figure 4:
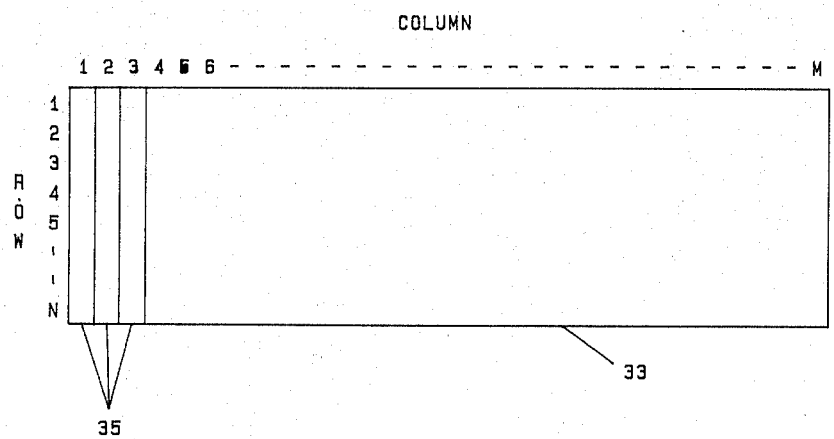
FIG. 4 is a diagram of the memory buffer array.

FIG. 4 shows memory buffer 33. This is used to temporarily store the data gathered by each pass of optical sensor 1. The width x of this buffer must equal the number of dots per inch in the horizontal direction times the maximum image width. For dot-matrix printers with graphics printheads of eight or less print elements, the buffer will be equal to the previously calculated width in bytes 35. Memory Buffer 33 can be made by allocating a workspace in the computer. The buffer locations are filled with pixel data in direct correspondence to the manner in which the data is collected. During the first pass of optical sensor 1 across the image, row 1 of the buffer is loaded. During the second pass, row 2 is loaded. This process continues until the required number of passes is made to fill the buffer. At that point, the buffer will be filled to the extent corresponding to the height of the printhead. Because there is a one-to-one correspondence between the collected data and the print elements of the printhead, the data can be sent directly to a printer, or to a modem for data transmission, or to the computer for storage. This is done by pointing to the first data byte in buffer 33 and clocking this byte out either as serial data bits or as eight bits of parallel data. After the last byte of data is sent, a command is also sent. This command corresponds to a printer paper feed equivalent to the height of the graphics printhead.

The process of moving the optical sensor across the image is repeated in groups until the entire image is completed.

Figure 5:
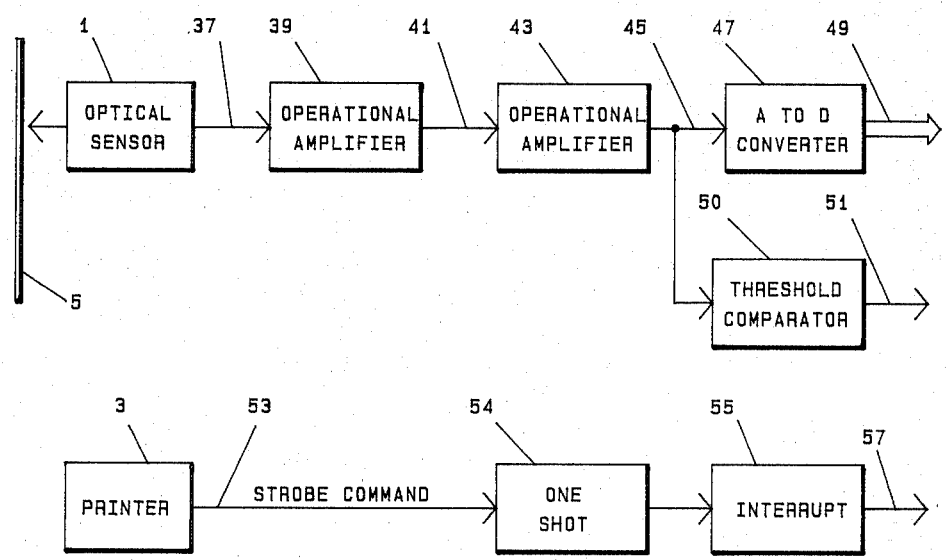
FIG. 5 is a block diagram illustrating the circuit diagram of the invention.

FIG. 5 is a block diagram showing circuitry for collecting the data, setting image intensity levels, converting the data to a form usable by the controlling computer, and accepting and buffering the strobe commands. The controlling computer coordinates the operation of the printer, the acceptance and processing of the data, and either the storage or transmission of the data. The functioning of the controlling computer is identical to that of a controlling microprocessor.

Referring to FIG. 5, optical sensor 1 senses the pixel area on the image 5 and sends the analog signal data to operational amplifier 39 over line 37. The voltage level on line 37 could be a maximum for a white image and a minimum for a black image or vice versa depending on the type of optical sensor used. The operational amplifier 39 is used to adjust the voltage on line 37 for the whitest image area. An operational amplifier 43 used to adjust the voltage on line 45 for the blackest portion of the image. The voltage levels on line 45 will then encompass the full range of values required for the analog-to-digital signal conversion performed by analog-to-digital converter 47. The selection of the bandwidth of operational amplifiers 39 and 43 is based on the rate of change of signals from optical sensor 1. The computation is well known in the art. The selection of the speed of the analog-to-digital converter 47 is based on the time required between successive data samples allowing for computer processing time. This calculation requires knowledge of the central processing unit (CPU) speed and the length of computer code and is well known in the art. The selection of the number of bits 49 of accuracy depends directly on the number of gray levels required for photographic imagery. A threshold comparator 50 is used for line imagery where only black/white decisions are required. The binary output 51 consists of either a data bit 0 for a black image or a data bit 1 for a white image. Dot-matrix printer 3 issues a strobe command along line 53. It may also be called a print command depending on the printer manufacturer. This command on line 53 is sent to a one-shot 55 to permit the setting of the command width to be compatible to the computer or microprocessor interrupt circuit 55. The width must be long enough to insure triggering of the computer or microprocessor but less than the time of the next strobe command.

Figure 6A:
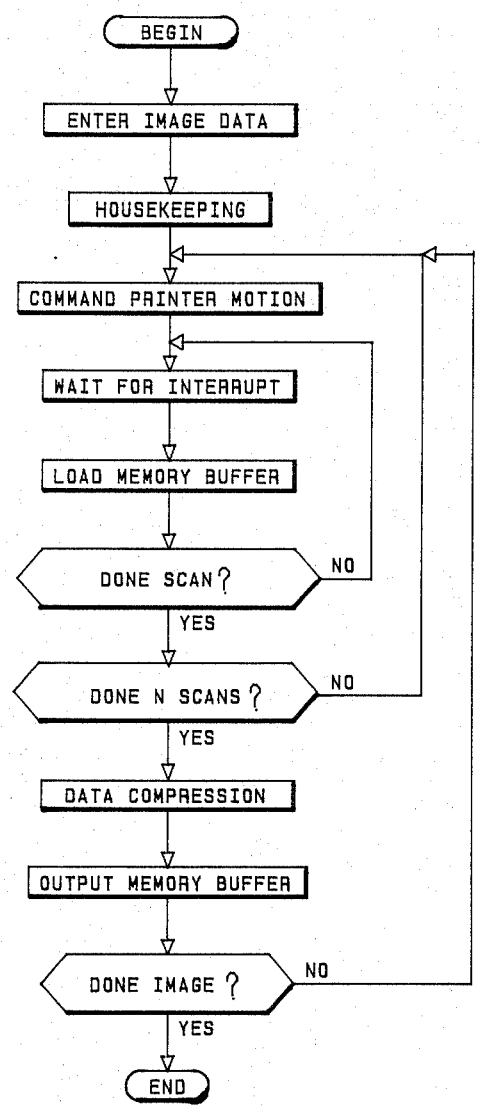
FIG. 6a and is an overall flow chart for the control of the processing.

FIG. 6a shows the overall flow chart for the computer or microprocessor program. The program can be coded in any language which will permit the operation to be made with sufficient speed so that the data from each reading will be processed.

There are three entries that the program uses to establish the operational criterion for the acquisition of the image. These are the height, width, and mode. This data is called for in the step called Enter Image Data. The height and width may be specified in any units and converted to the number base of the computer. The mode is entered as either the line or photographic mode. This specified mode can be used to set a flag condition. Housekeeping is used to set up a memory buffer work space depending on the image width, initialize counters, and to set up a command sequence for the printer. The user may also establish a choice for either the permanent storage of image data such as a disk file or the direct transmission of the data to a modem or other printer.

With the optical sensor mounted on the printhead or other moving platform, the user physically moves the platform and/or image so that the sensor is at the starting point. This could be the upper left corner. Of course, this setting of the sensor could alternatively be accomplished automatically by appropriate electronic circuitry or other means readily within the capability of one of ordinary skill in the art.

Command Printer Motion calls for reading the command sequence and sending it to the printer. This causes printer 3 to move the printhead one scan or pass across the image 5 and to move the image 5 up one dot height at the end of the printhead travel. The printer mechanism, in response to the command sequence will issue the strobe command along line 53 as shown in FIG. 5 as the printhead moves across each pixel in the image-bearing medium 5.

After the computer issues the command sequence, it is placed in an idle loop as specified by Wait For Interrupt. The interrupt command along line 57 as shown in FIG. 5 informs the computer 9 that the optical sensor 1 is currently crossing through a pixel and that data is available for reading. The data is available from the output of the analog-to-digital converter 47 or the threshold comparator 50. The selection of which input lines 49 or 51 can be based on the flag allocated during the selection of the mode. The receipt of the interrupt command along line 57 causes the computer 9 to perform the step—Load Memory Buffer—in a process detailed below. When the data for the pixel has been loaded, the computer checks to determine if all of the pixels from the first scan have been read. If not, the computer returns to Wait For Interrupt. If all readings have been made, the computer checks to determine if the required number of scans have been made. If not, the computer returns to Command Printer Motion. If all scans have been made, the computer memory buffer has been filled with a sequence of graphic data bytes equivalent to the corresponding scanned pixels.

Figure 7:
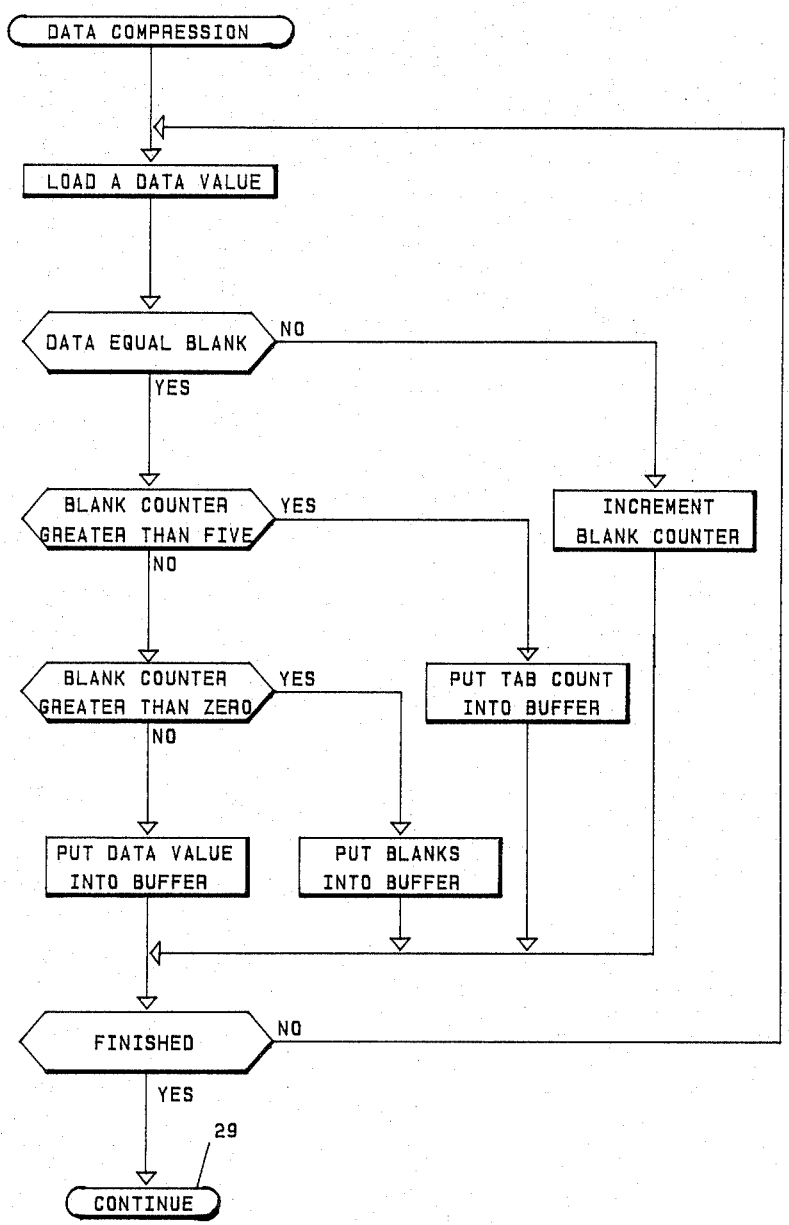
FIG. 7 is a flow chart for the data compression routine.

A data compression routine is shown in FIG. 7 for printers with special character control features. This routine reduces the amount of data stored in the buffer and, consequently, the file space or transmission time requirements. The routine is described in detail below.

Referring again to FIG. 6a, the contents of memory buffer 33 are then sent out to the previously specified storage of data transmission medium in the Output Memory Buffer routine. Upon completion, the computer also sends a command sequence which is equivalent to an n-dot vertical move for a printer. This is to insure that, after that data is printed, the printer is incremented vertically to be ready for the next data sequence. After the Output Memory Buffer function, the computer checks to determine if the entire image has been scanned. If not, the computer returns to Command Printer Motion.

Figure 6B:
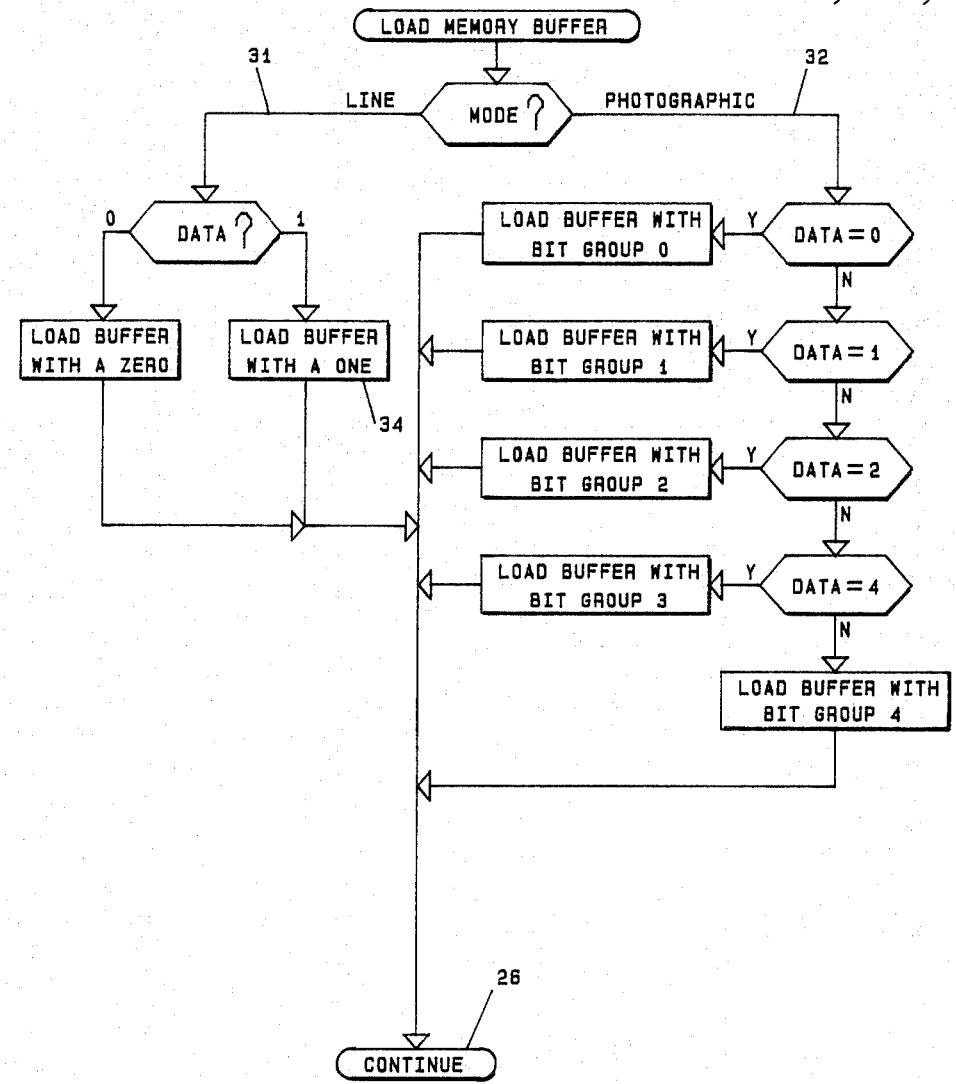
FIG. 6b is a flow chart for loading the memory buffer.

FIG. 6b shows the program flow for the Load Memory Buffer function for both the line and photographic modes. Upon receipt of the interrupt command 57, the computer checks to determine whether the line mode or photographic mode has been selected. In the line mode, the data from the threshold comparator 50 is read in. If the data is a 0 bit, the computer selects the column C corresponding to the appropriate pixel that the optical sensor 1 is passing over in conjunction with the row R corresponding to the n-th scan, and loads the memory buffer 33 at that point with a data bit 0. Similarly, if the data is a 1 bit, the same process occurs with the exception that a data bit 1 is loaded.

If the photographic mode has been selected, the data from the analog-to-digital converter 47 is read in. The value of this data corresponds directly to the tonal shade ranging from black to white within the pixels. In the following example, a gray scale of five levels is shown. However, any number of gray levels could be used depending on the accuracy of the analog-to-digital converter and the computer's ability to accept and process the data within the constraint of the processing speed.

Figures 6C, 6D:
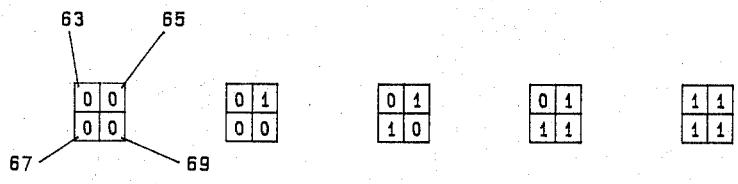
FIGS. 6c and 6d show the gray-scale bit patterns for 2-by-2 and 3-by-3 arrays.

FIG. 6c shows a representation of five gray levels ranging from white in bit distribution pattern 0 to black in bit distribution pattern 4. Each bit distribution pattern consists of data bits 0 or 1 as shown. The tonal value in each sampled pixel is converted to one of the five bit patterns depending on the value at line 49. Because most dot-matrix printers cannot control the intensity of the printed dot, these bit patterns provide a direct correspondence by virtue of the quantity and distribution of dots printed. For printers where dot intensity, often called Z-axis modulation, is featured, these bit patterns are translated into intensity control. In the example shown in FIG. 5c, each bit pattern is stored in a two by two bit location in the computer. The selected pattern is loaded into the memory buffer depending on the value at line 40.

FIG. 6d shows a representation of ten gray levels using a 3-by-3 bit array.

In FIG. 6b at line 61, the value at line 49 is checked to determine if it is a 0. This could correspond to white. If its is, the computer selects bit distribution pattern 0 shown in FIG. 5, 6c and 6d and loads this pattern into memory buffer. This is done by ascertaining the current row-column relationship as previously noted in describing the functioning of the line mode. This determines the starting point for the memory loading. In order to load the bit group, four operations are required. This is shown in FIG. 5c. The first bit 63 of bit pattern 0 is selected. This bit is loaded into the memory buffer at row R and column C. Then the second bit 65 is loaded into the memory buffer at row R column C+1. The third bit 67 is loaded into row R+1 column C and the fourth bit 69 into row R+1 column C+1.

Because, in the case of a five level gray scale, four locations of the memory buffer have been used, the counter controlling the loading of the buffer must be incremented by two each time. In addition, the number of scans must be reduced by n/2. Finally, alternate readings of the Wait For Interrupt must be skipped.

Returning again to FIG. 6b, for the case of photographic mode, the process as described above continues such that if the value at line 49 was not a 0, line 49 is checked until the value is determined. At the completion of either the load buffer sequence for the line mode or the photographic mode, the processing continues at the Done Scan step as shown in FIG. 5a.

In the photographic mode wherein gray scales are used, there are several methods that can be used to provide image reproductions or representations. In the process detailed above in connection with FIGS. 5c and 5d, a five-level gray scale requires the establishment of five bit or dot distribution patterns. There is a one-to-one correspondence between the gray scale level and the number of bit patterns. When bit distribution patterns are used, instead of controlling dot intensity, the patterns are designed to appear random and at the same time to appear to represent a good tonal scale when printed. FIG. 5d shows bit patterns for a nine-level gray scale. In this case, it can be seen that the patterns are made of a three-by-three dot array. A four-by-four dot array yields a gray scale of seventeen and so on. There are specific tradeoffs that are required in the specification of the gray scale. These include the memory buffer size and the image resolution. If the number of bytes in the memory buffer is made identical to the image width in dots, then either the maximum scan width for the image must be reduced by the bit pattern array size or the resolution must be reduced by skipping pixel readings by the same amount.

FIG. 7 shows the flow chart for the data compression routine. The use of this routine is dependent on whether the printer has certain control features in the graphics mode. Two features well known in the art include tab and repeat characters. In concept, the memory array 33 when loaded with data, contains bytes which conform to the standard ASCII characters. For example, a byte value in decimal of 64 prints as a "@". In the graphics mode of a printer such as the ANADEX 9501, the byte value of decimal 32 prints as a "blank" or a space. Many graphics images consist of wide arrays of white space or blank areas. When these areas are optically scanned and loaded into the memory buffer using the previously specified process, the memory array may contain sequences of identical characters. Rather than store this repetitive information, a count of the repetitive data can be established and this count stored instead. This is the nature of the data compression routine and is described as follows.

The first data byte in the memory array 33 is loaded into a temporary storage area. The byte is compared to any data value which may be a repetitive one. In this case, the data byte is being compared to a 64 or "blank". If the data byte is a blank, the blank counter (not shown) is incremented at the step called Increment Blank Counter. If the data byte is not a blank, the blank counter is tested to determine if it is greater than five. The actual number depends on the printer. In this case, it takes five control characters to generate a "tab" value. As a result, there is no compression when there is a sequence of five or less "blanks". If the blank counter is greater than five, the actual count of the blank counter is placed into the memory buffer 33 instead of the data. If the count is less than five, the blank counter is tested to determine if the count is greater than 0. If it is, that number of "blanks" are returned to the memory buffer 33. If not, the actual data value, a single byte, is returned to memory buffer 33. Memory buffer 33 is tested to determine if the entire buffer has been examined. If not, the process continues at Load a Data Value. If the memory buffer 33 has been completely examined, the process is complete and the Output Memory Buffer routine follows.

Figure 8:
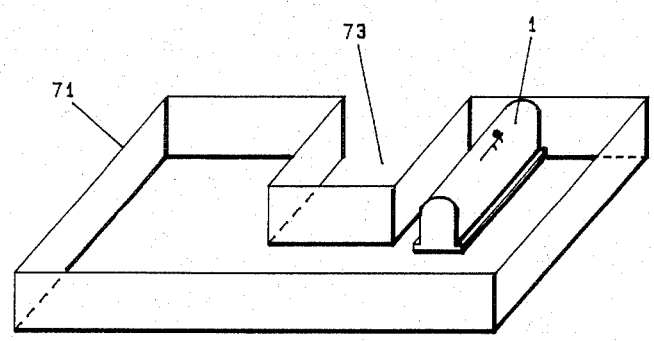
FIG. 8 is an isometric view of the mounting of the optical sensor to a printer platform.

Referring now to FIG. 8, the optical sensor 1 may be mounted to a printer platform either permanently or as an adapter.

The preferred method for adapting the optical sensor 1 to the printhead is shown in FIG. 8. The case 71 is identical to a printhead ribbon cartridge, well known in the art, for holding the printer ribbon in position. Ribbon cartridges are manufactured in a variety of configurations which encompass various shapes and mounting provisions. The objective here is to show that the cartridge housing can be used, with the ribbon and attendant parts removed, to mount the optical sensor 1. The sensor can be affixed to a location to the left or right of the printhead region 73. The ribbon cartridge cover is not illustrated. The advantage of this method is that the optical sensor mass is approximately the same as that of the ribbon. With the ribbon removed, the total mass of the printhead is not disturbed. Another advantage is that the optical sensor 1 is located in horizontal alignment with the printhead such that the sensor 1 is disposed perpendicularly to the image surface in the same manner that the printhead requires.

Figure 9:
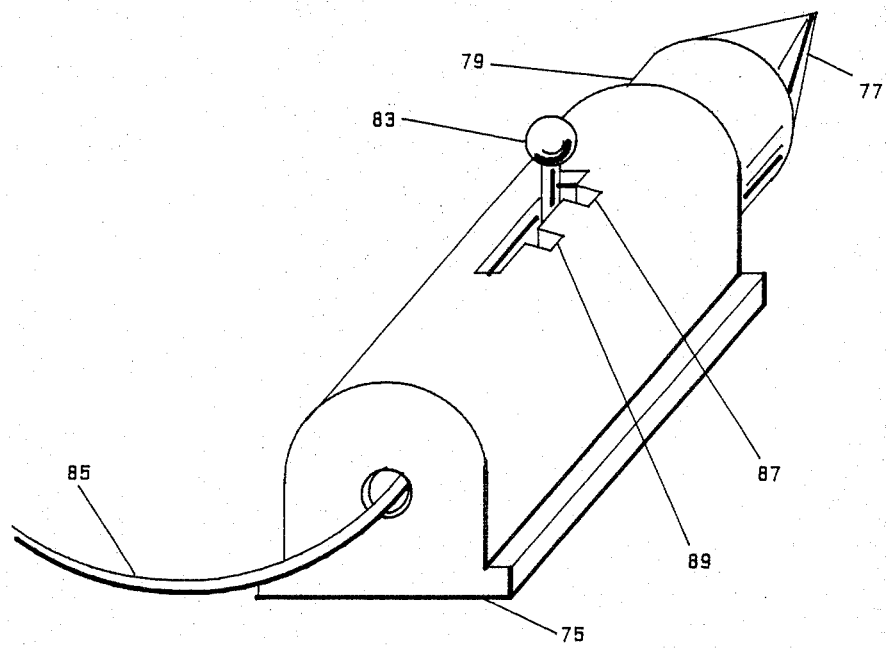
FIG. 9 is a plan view of the optical sensor mechanical mounting.

FIG. 9 shows details of the mechanical mount 75 of optical sensor 1. Mount 75 is formed by optical sensor 1, positioning extension 77, concentric sliding tube 79, a spring 81, lever 83, and sensor cable 85. In practice, when mounted, mount 75 insures that optical sensor 1 is maintained at a fixed distance from the image 5 surface independent of variations in the printhead-to-image distance. This is caused by the action of the spring 81 forcing the concentric sliding tube 79 and attendant parts against the image surface. The image surface-to-optical sensor distance is fixed by the length of the positioning extension 77. This configuration is possible with the lever 83 in position 87 as shown in FIG. 9.

Figure 10:
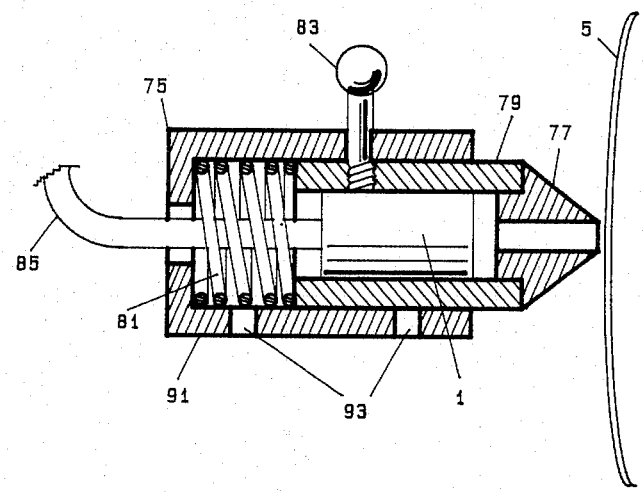
FIG. 10 is a sectional view of the optical sensor mechanical mounting shown in FIG. 9.

In some cases, the aforementioned configuration might bind if the travel length of the printhead extends beyond either side of the image surface. FIG. 10 shows lever position 87 which locks the optical sensor into a fixed position so that positioning extension 77 does not contact the image 5 surface. Positioning extension 77 is removable by the user. Lever position 89 is used to fully retract positioning extension 77 for the purpose of enabling the images into the printer without causing binding against positioning extension 77.

Mount 75 is located within case 71 as shown in FIG. 8. It can be affixed to the case 71 using glue on the bottom surface 91 or via bolt holes 93. Alternatively, mount 75 can be adapted to the printhead, without the use of the case, using VELCRO fastening techniques. This is done by selecting a flat area approximatizing the size of mount 75 near the printhead. Mount 75 can be permanently built into the printhead.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a dot-matrix printer, the improvement comprising:
   (a) a sensor for sensing the optical intensity levels of an image-bearing medium inserted on the printer paper feed mechanism, the sensor being mounted to a housing in the printer for continuous linear movement during scanning across the image-bearing medium; and
   (b) means responsive to the printer strobe command for sampling the output of the sensor at predetermined intervals.

2. The dot-matrix printer as recited in claim 1 wherein the housing in which the sensor is mounted is the printhead platform.

3. The printer as recited in claim 2 wherein the printhead has been unplugged and replaced by the sensor.

4. The printer as recited in claim 1 wherein the housing in which the sensor is mounted is the ribbon cartridge housing.

5. The printer as recited in claim 4 wherein the ribbon cartridge has been removed and replaced by the sensor.

6. The printer as recited in claim 1 further comprising biasing means for biasing the sensor to bear against the surface of the image-bearing medium.

7. The printer as recited in claim 6 wherein the biasing means includes spring-torsion means.

8. The printer as recited in claim 1 wherein the focus of the optical sensor is preset such that no contact with the image-bearing medium is required.

9. A method of generating a digitized representation of an image using a dot-matrix printer adapted to include an optical scanner for opto-electrically sensing the optical intensity levels of the image comprising the steps of:
   (a) sampling the optical intensity level of pixels in a line of the image at a predetermined sampling density;
   (b) storing data for representing in dot form the varying optical intensity levels of the pixels forming the image, the data stored for each optical intensity level having a pixel space which as a one-to-one corespondence with the input pixel space, the stored data for representing two levels of optical intensity;
   (c) retrieving the stored data responsive to the sampled optical intensity levels of the image;
   (d) recording the retrieved data for each sampled pixel to provide a representation of the image in which one pixel space in the reproduced image corresponds to a sampled pixel space in the original image.

10. A method of generating a digitized representation of an image using a dot-matrix printer adapted to include an optical scanner for opto-electrically sensing the optical intensity levels of the image comprising the steps of:
    (a) sampling the optical intensity level of pixels in a line of the image at a predetermined sampling density;
    (b) storing data for representing in dot form the varying optical intensity levels of the pixels forming the image, the data stored for each optical intensity level having a pixel space which has a one-to-one corespondence with the input pixel space, the stored data for represeneting at least two levels of optical intensity;
    (c) retrieving the stored data responsive to the sampled optical intensity levels of the image;
    (d) recording the retrieved data for each sampled pixel to provide a representation of the image in which one pixel space in the reproduced image corresponds to a sampled pixel space in the original image.

11. A method of generating a digitized gray-scale representation of an image using a dot-matrix printer adapted to include an optical sensor for opto-electrically sensing the optical intensity levels of an image-bearing medium comprising the steps of:
    (a) sampling the optical intensity level of a line of the image at a predetermined sampling density; and
    (b) providing a representation of the image which has a data density which is greater than the sampling density where the distribution of the output data of a particular point in the representation is related to the optical intensity level of the corresponding point in the image.

12. The method as recited in claim 11 wherein the dot-matrix printer strobe command signal frequency is an integer multiple of the frequency corresponding to the predetermined sampling density.

13. A method of generating a digitized gray-scale representation of an image using a dot-matrix printer adapted to include an optical scanner for opto-electrically sensing the optical intensity level of the image comprising the steps of:
    (a) sampling the optical intensity level of pixels in a line of the image at a predetermined sampling density;
    (b) storing data for representing in distributed dot form the varying optical intensity levels of the pixels forming the image, the data stored for each optical intensity level having more than one pixel space;
    (c) retrieving the stored data responsive to the sampled optical intensity levels of the image; and
    (d) recording the retrieved data for each sampled pixel to provide a representation of the image in which more than one pixel space for containing dots in the reproduced image corresponds to each sampled pixel in the original image.

14. The method as recited in claim 13 wherein the data is stored in a look-up table containing a plurality of square arrays of pixels, each array for containing a distribution of digital data, each array corresponding to a predetermined optical intensity level.

15. A method of generating a digitized representation of an image using a dot-matrix printer adapted to include an optical sensor for opto-electrically sensing the intensity level of the image comprising the steps of:
  (a) passing the sensor linearly across the image in continuous movement while scanning;
  (b) sampling the optical intensity level of the image at a predetermined sampling rate determined by the print strobe signal frequency;
  (c) loading the sampled data for each linear pass into a row of an n x m memory array until the memory array is filled with data;
  (d) transmitting the data in the memory array column-by-column to an external device; and
  (e) recording the transmitted data to provide a representation of the original image.

16. In a dot matrix printer having a print head platform laterally displaceable relative to a paper feed mechanism, print head mounting means on the print head platform for mounting a print head with a plurality of vertically displaced, individually actuatable pins, ribbon cartridge mounting means on the print head platform for mounting a cartridge having ribbon that is operatively associated with said pins, and means for issuing a printer strobe command at each of a plurality of predetermined lateral positions of the print head platform to actuate said pins and print dots on said medium whose lateral spacing defines dot locations, the improvement comprising:
  (a) a sensor mounted on the print head platform for movement therewith, and responsive to the optical intensity of an image on said medium for producing a signal; and
  (b) means responsive to said signal and to printer strobe commands for producing representations of the optical intensity of the image at the positions of the print head platform at which the printer strobe commands occur.

17. The invention of claim 16 wherein said signal has a value at a given instant which is representative of the optical intensity of a pixel viewed by the sensor at that instant.

18. The invention of claim 17 wherein said signal is sampled in synchronism with the printer strobe commands.

19. The invention of claim 16 wherein said sensor is connected to said print head mounting means in place of said print head.

20. The invention of claim 16 wherein said sensor is connected to said print head which is mounted in said print head mounting means.

21. The invention of claim 16 wherein said sensor is connected to said ribbon cartridge mounting means in place of said ribbon cartridge.

22. The invention of claim 16 wherein said sensor is connected to said ribbon cartridge which is mounted in said ribbon cartridge mounting means.

23. The invention of claim 18 including means for storing a digital representation of the sampled outputs of said sensor at addresses corresponding to the positions of the print head platform when printer strobe commands are issued.

24. The invention of claim 19 including means responsive to said stored representation for reconstructing an image.

25. The invention of claim 24 wherein said means responsive to said stored representation reconstructs an image whose size is the same as that of the original image.

26. The invention of claim 24 wherein said means responsive to said stored representation reconstructs an image whose size is different from the size of the original image.

27. The invention of claim 26 wherein said means responsive to said stored representation reconstructs an image whose size is smaller than the original image.

28. The invention of claim 26 wherein said means responsive to said stored representation reconstructs an image whose size is larger than the original image.

29. The invention of claim 24 wherein the reconstructed image is binary.

30. The invention of claim 24 wherein the reconstructed image has a grey-scale.

* * * * *